US012569091B1

(12) United States Patent
Pamplin

(10) Patent No.: US 12,569,091 B1
(45) Date of Patent: Mar. 10, 2026

(54) CUSTOMIZABLE FACES FOR BLENDER USER INTERFACE

(71) Applicant: MavorCo Operations LLC, New York, NY (US)

(72) Inventor: Ryan Michael Pamplin, San Juan, PR (US)

(73) Assignee: MavorCo Operations LLC, New York, NY (US)

( * ) Notice: Subject to any disclaimer, the term of this patent is extended or adjusted under 35 U.S.C. 154(b) by 860 days.

(21) Appl. No.: 17/730,982

(22) Filed: Apr. 27, 2022

(51) Int. Cl.
*A47J 43/046* (2006.01)
*A47J 43/07* (2006.01)

(52) U.S. Cl.
CPC ......... *A47J 43/0716* (2013.01); *A47J 43/046* (2013.01)

(58) Field of Classification Search
CPC ............................ A47J 43/0716; B67D 1/0041
See application file for complete search history.

(56) References Cited

U.S. PATENT DOCUMENTS

| | | | |
|---|---|---|---|
| 10,328,402 B2 | 6/2019 | Kolar | |
| 10,383,482 B1 | 8/2019 | Pamplin | |
| 10,828,612 B1 | 11/2020 | Pamplin | |
| 10,987,643 B1 * | 4/2021 | Wallace | A47J 43/046 |
| 11,659,958 B1 | 5/2023 | Pamplin | |
| 12,022,980 B2 | 7/2024 | Pamplin | |
| 12,268,334 B2 | 4/2025 | Pamplin | |
| 2014/0149239 A1 | 5/2014 | Argue | |

| | | |
|---|---|---|
| 2016/0331179 A1 | 11/2016 | Koether |
| 2017/0224169 A1 | 8/2017 | Kolar |
| 2018/0070760 A1 | 3/2018 | Herbert |
| 2018/0116467 A1 | 5/2018 | Ciepiel |
| 2018/0161741 A1 | 6/2018 | Sedlacek |
| 2018/0184847 A1 | 7/2018 | Kaufmann |
| 2020/0000130 A1 | 1/2020 | Roeckl |
| 2020/0035866 A1 | 1/2020 | Lee |
| 2020/0205615 A1 | 7/2020 | Pamplin |
| 2020/0219606 A1 | 7/2020 | Koh |
| 2020/0275807 A1 | 9/2020 | Kolar |
| 2020/0375402 A1 | 12/2020 | Krivos |
| 2021/0059475 A1 | 3/2021 | Jung |
| 2022/0296044 A1 | 9/2022 | Sun |
| 2022/0322881 A1 | 10/2022 | Pamplin |
| 2023/0218115 A1 | 7/2023 | Pamplin |

FOREIGN PATENT DOCUMENTS

| | | |
|---|---|---|
| CN | 106580130 A | 4/2017 |
| CN | 112386134 A | 2/2021 |
| WO | 2021115942 | 6/2021 |

OTHER PUBLICATIONS

PCT International Search Report and Written Opinion, PCT Application No. PCT/US2022/023178, mailed Jul. 20, 2022 (8 pages).

(Continued)

*Primary Examiner* — Elizabeth Insler

(74) *Attorney, Agent, or Firm* — Esplin & Associates, PC

(57) ABSTRACT

A blender is provided with a user interface that includes a touchscreen. Exemplary implementations may: store a set of images; receive user input through the touchscreen; select an image from the set, which may be based on the user input; control display of the selected image on the touchscreen; and control an electrical motor of the blender based on particular user input.

11 Claims, 6 Drawing Sheets

(56)     References Cited

OTHER PUBLICATIONS

Sara Seitz, 10 Best Salad Dressing Containers for Healthy Eating on the Go, Clean Green Simple, Jul. 24, 2021, https:// cleangreensimple. com/article/best-salad-dressing-container/ (Year: 2021).
Anonymous: "3 Ways to Disable Haptic Feedback on Android—wikiHow Tech", Jul. 14, 2015 (Jul. 14, 2015), pp. 1-2, XP093246433, wikihow.tech Retrieved from the Internet: URL:https://www.wikihow. tech/Disable-Hapti c-Feedback-on-Android [retrieved on Feb. 4, 2025].
Espacenet translation of Yu, Ju-lin (CN106580130A), 4 pages, published Apr. 26, 2017 (Year: 2017).

* cited by examiner

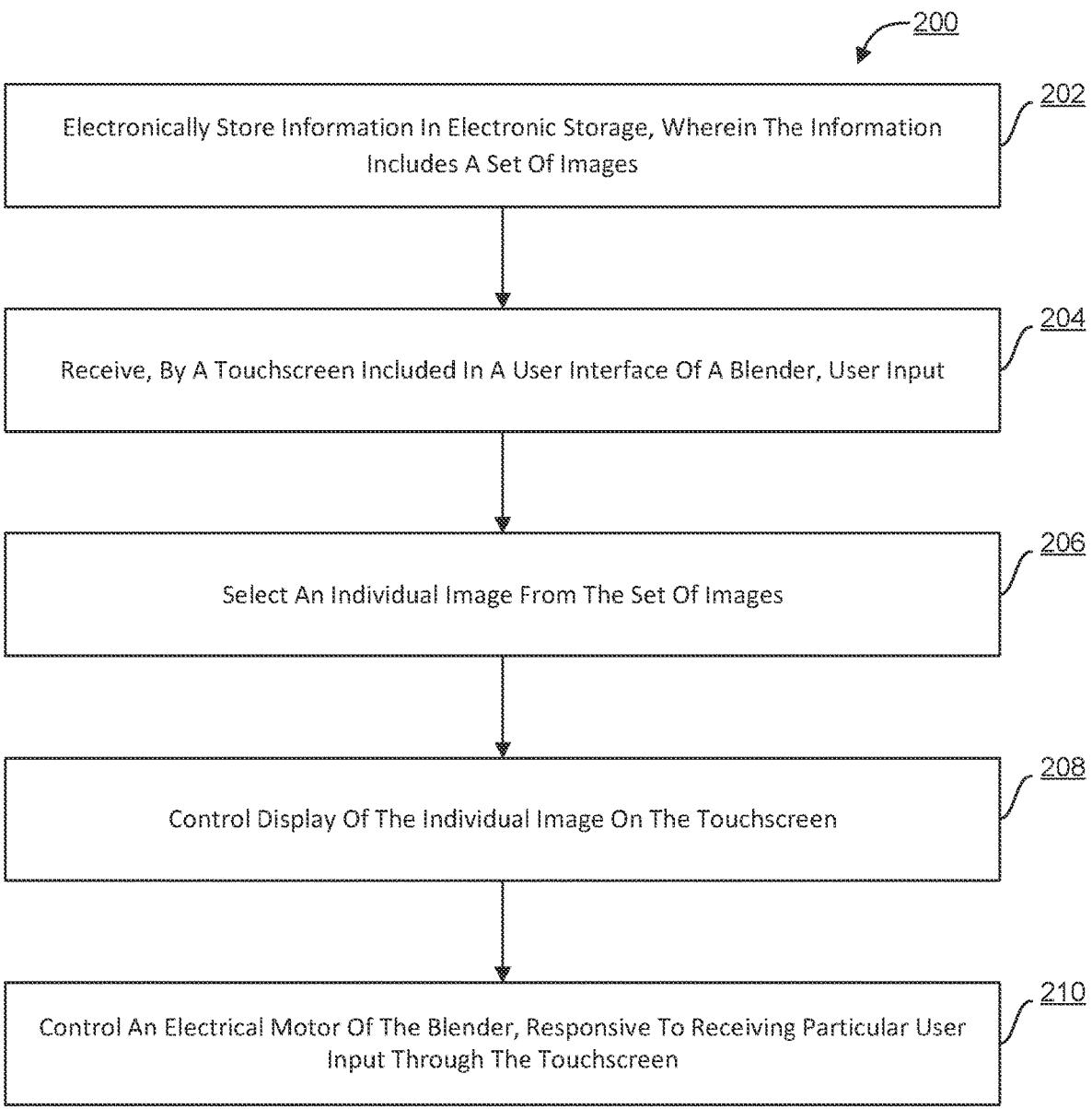

200

202
Electronically Store Information In Electronic Storage, Wherein The Information Includes A Set Of Images 204
Receive, By A Touchscreen Included In A User Interface Of A Blender, User Input 206
Select An Individual Image From The Set Of Images 208
Control Display Of The Individual Image On The Touchscreen 210
Control An Electrical Motor Of The Blender, Responsive To Receiving Particular User Input Through The Touchscreen

Fig. 2

Base Assembly
11

Base body
11b

Logo 27 image 31a

Touchscreen 31

Charging interface 25

Base Assembly
11

Base body
11b

Logo 27 image 31b

Touchscreen 31

Charging interface 25

Base Assembly
<u>11</u>

Base body
<u>11b</u>

Logo <u>27</u> image <u>31c</u>

Touchscreen <u>31</u>

Charging interface <u>25</u>

Base Assembly
_11_

Base body
11b

Logo 27 image 31d

Touchscreen 31

Charging interface 25

CUSTOMIZABLE FACES FOR BLENDER USER INTERFACE

FIELD OF THE DISCLOSURE

The present disclosure relates to blenders with touchscreen interfaces, particularly portable blenders displaying customizable images on their touchscreens.

BACKGROUND

Blenders are known, typically as consumer-grade home appliances. Touchscreen user interfaces are known, e.g., for personal computing devices, game consoles, and cell phones. For some types of interfaces, e.g., on cell phones, customizable images (e.g., as a background) may be known.

SUMMARY

One aspect of the present disclosure relates to a blender configured to blend foodstuffs. The blender includes a user interface that has a touchscreen configured to receive user input from a user. The blender also includes one or more hardware processors configured by machine-readable instructions to select and display an individual image from a set of images on the touchscreen. The blender is further configured to control an electrical motor to drive rotation of a blending component, such as a set of blades. In some implementations, the blender may be portable due to its size, and/or its rechargeability. By virtue of true portability, the user can take the blender anywhere and create drinks, shakes, smoothies, baby food, sauces, and/or other concoctions. A fully charged blender can prepare multiple servings quickly and easily. Lack of an external power source, much less a reliable external power source, is no longer preventing users from enjoying blended drinks. By virtue of the blender and the user interface described in this disclosure, different images may be displayed on the user interface, which may provide customization and/or personalization of a user's experience, encourage use of the blender, provide inspiration and/or other useful information to users, and/or otherwise enhance the user's experience. The control interface may include a (round) touchscreen that is configured to receive user input.

The blender may include one or more of a blending component, a base assembly, a container assembly, an electrical motor, a user interface, electronic storage, one or more hardware processors and/or control circuitry, and/or other components. As used herein, the term "foodstuffs" may include ingredients ranging from solid to liquid, from hot to cold or frozen, in any combination. As used herein, the term "ingredient" merely connotates something fit to ingest, and not necessarily nutritional value. For example, ice and/or ice cubes may be ingredients.

One aspect of the present disclosure relates to a method of blending foodstuffs and displaying customizable images on a touchscreen of a blender. The method may include electronically storing information in electronic storage, wherein the information includes a set of images. The method may include receiving, by the touchscreen included in the user interface of the blender, user input. The method may include selecting an individual image from the set of images. The method may include controlling display of the individual image on the touchscreen. The method may include controlling an electrical motor of the blender, responsive to receiving particular user input through the touchscreen, and/or performing other steps.

As used herein, any association (or relation, or reflection, or indication, or correspondency) involving assemblies, blending components, blades, motors, rotational axes, longitudinal axes, diameters, batteries, couplings, interfaces, touchscreens, images, detectors, indicators, magnetic components, caps, rotations, and/or another entity or object that interacts with any part of the blender and/or plays a part in the operation of the blender, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 shows a method for blending foodstuffs and displaying customizable images on a touchscreen of a blender, in accordance with one or more implementations.

DETAILED DESCRIPTION

Figure 1:
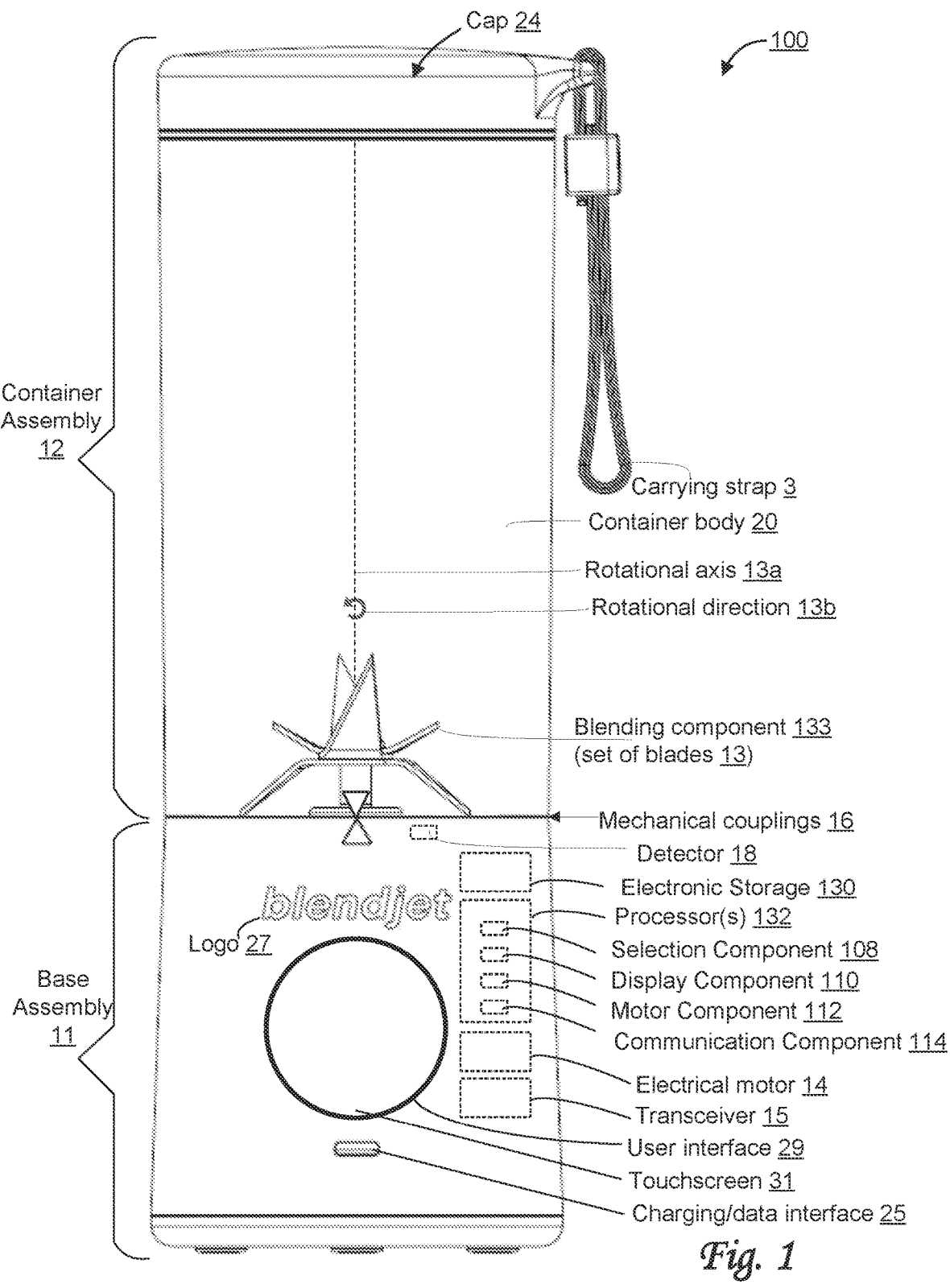
FIG. 1 shows a front view of a blender configured to blend foodstuffs and display customizable images on its touchscreen, in accordance with one or more implementations.

FIG. 1 shows a blender 100 configured to blend foodstuffs and display customizable images on a touchscreen 31, in accordance with one or more implementations. By virtue of blender 100 and touchscreen 31 as described in this disclosure, different images may be displayed on touchscreen 31, which may provide customization and/or personalization of a user's experience, encourage use of blender 100, provide inspiration and/or other useful information to users, and/or otherwise enhance the user's experience. Blender 100 may include one or more of a base assembly 11, a container assembly 12, a blending component 133, a user interface 29, electronic storage 130 (depicted in FIG. 1 as a dotted rectangle to indicate this component may be embedded within base assembly 11, and not readily visible from the outside), one or more hardware processors 132 (depicted in FIG. 1 as a dotted rectangle to indicate this component may be embedded within base assembly 11, and not readily visible from the outside), and/or other components. User interface 29 may include touchscreen 31 and/or other components. Base assembly 11 and container assembly 12 may be configured to be coupled during blending by blender 100. For example, in some implementations, base assembly 11 and container assembly 12 may be mechanically coupled, e.g., through one or more threaded couplings. Other types of couplings may be envisioned for blender 100, though leak-proof options are preferred, since most uses include one or more liquid ingredients.

In some implementations, at least some components may be included in base assembly 11, e.g., within base assembly 11. For example, one or more of user interface 29, an electrical motor 14 (depicted in FIG. 1 as a dotted rectangle to indicate this component may be embedded within base assembly 11, and not readily visible from the outside), a transceiver 15 (depicted in FIG. 1 as a dotted rectangle to indicate this component may be embedded within base assembly 11, and not readily visible from the outside), and/or other components may be integrated permanently into base assembly 11 such that base assembly 11 forms an integral whole. In some implementations, the phrase "integrated permanently" may refer to components being integrated such that they are not readily accessible, serviceable, and/or replaceable by a user, or at least not during ordinary usage by the user, including, but not limited to, charging, blending, cleaning, and storing for later use.

Figure 3A:
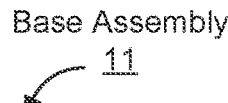
FIGS. 3A-3B-3C-3D show front views of a base assembly of a blender configured to blend foodstuffs and display customizable images on its touchscreen, in accordance with one or more implementations.

In some implementations, base assembly 11 may include one or more of a base body 11b (as depicted in FIG. 3A, containing at least some of the components of base assembly 11), blending component 133 (e.g., a set of blades 13, also referred to as a set of one or more blades 13), electrical motor 14, transceiver 15, a charging/data interface 25, one or more mechanical couplings 16, a detector 18 (depicted in FIG. 1 as a dotted rectangle to indicate this component may be embedded within base assembly 11, and not readily visible from the outside), one or more alignment indicators, user interface 29, and/or other components.

Referring to FIG. 1, blending component 133 may include one or more structural components configured to blend foodstuffs, including but not limited to one or more blending bars, one or more blades, and/or other structural components configured to rotate. For example, in some implementations, blending component 133 may include set of blades 13, which may be rotatably mounted to base assembly 11 to blend foodstuffs. Blending component 133 may be configured to rotate around a rotational axis 13a. Rotational axis 13a is depicted in FIG. 1 as a geometric 2-dimensional line extending indefinitely through blending component 133, and is not a physical axis. Rather, rotational axis 13a indicates how blending component 133 rotates in relation to other components of blender 100, in a rotational direction 13b. In some implementations, blending component 133 may be mounted permanently to base assembly 11.

In some implementations, set of blades 13 may include 1, 2, 3, 4, 5, or more pairs of blades. In some implementations, a pair of blades may include two blades on opposite sides of rotational axis 13a. In some implementations, a pair of blades may have two blades such that the distal ends of these two blades are at the same horizontal level. In some implementations, as depicted in the upright configuration of blender 100 in FIG. 1, set of blades 13 may include six blades that form three pairs of blades. In some implementations, set of blades 13 may include at least two downward blades, which may prevent and/or reduce foodstuffs remaining unblended when disposed under the upward blades. In some implementations, set of blades 13 may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than broken, crushed, and/or blended, in particular for implementations having limited power (here, the term "limited" is used in comparison to blenders that are connected to common outlets during blending), such as disclosed herein. As used herein, directional terms such as upward, downward, left, right, front, back, and so forth are relative to FIG. 1 unless otherwise noted.

Transceiver 15 may be configured to transmit and/or receive information, e.g., by using an antenna (not depicted). This information may be generated and/or used by blender 100, e.g., by communication component 114. By way of non-limiting example, image information received through transceiver 15 may be displayed on touchscreen 31.

Electronic storage 130 may comprise non-transitory storage media that electronically stores information, including but not limited to machine-readable instructions, a set of (digital) images, image information, and/or other information. The electronic storage media of electronic storage 130 may include one or both of system storage that is provided integrally (i.e., substantially non-removable) with blender 100 and/or removable storage that is removably connectable to blender 100 via, for example, a port (e.g., a USB port, a firewire port, charging/data interface 25, etc.) or a drive (e.g., a disk drive, etc.). As used herein, the term "non-removable" may mean not accessible to users during common usage of blender 100, including charging, blending, cleaning, and storing for later use. Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from blender 100, information received from client computing platform(s) 104, and/or other information that enables blender 100 to function as described herein.

The machine-readable instructions stored in electronic storage 130 may include one or more instruction components. The instruction components may include computer program components. The instruction components may include one or more of a selection component 108, a display component 110, a motor component 112, a communication component 114, and/or other instruction components Processor(s) 132 may be configured to provide information processing capabilities in blender 100. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, and/or 114, and/or other components. Processor(s) 132 may be configured to execute components 108, 110, 112, and/or 114, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within two separate processing units, this is exemplary. In implementations in which processor(s) 132 and/or processor(s) 132 include multiple processing units, one or more of components 108, 110, 112, and/or 114 may be implemented remotely from the other components. The description of the functionality provided by the different components 108, 110, 112, and/or 114 described below is for illustrative purposes only, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 132 may be configured to execute one or more additional components that may perform some or all of the functionality attributed below to one of components 108, 110, 112, and/or 114.

Selection component 108 may be configured to select individual images from a set of images (in particular, digital images). For example, the set of images may be stored in electronic storage 130. In some implementations, selection by selection component 108 may be based on user input received from a user, e.g., through user interface 29. In some implementations, one or more of the images may be an animated image, such as, by way of non-limiting example, an image in the Graphics Interchange Format (GIF). In some implementations, selection component 108 may be configured to identify and/or detect trigger events, e.g., based on usage of blender 100 or otherwise unlocked by the user. For example, individual transitions from a blending mode of operation to a non-blending mode of operation may be individual triggers, identified and/or detected by selection component 108. In some implementations, a predetermined number of such transitions may be an individual trigger (e.g., every 10 times blender 100 is used, or every 25 times, or another predetermined number of times, every week of consecutive daily use of blender 100, etc.). In some implementations, selections by selection component 108 may be based on such detected triggers (including but not limited to achievements by the user that unlock additional images). For example, a new image may be selected after every 10th usage of blender 100. In some implementations, the set of images stored in electronic storage 130 may be organized in a hierarchy, or according to a tiered structure. For example, the set of images may have a first tier that includes a first subset of images, a second tier that includes a second subset of images, a third tier that includes a third subset of images, and so forth. As time passes, higher tier images may become available for selection by the user (or by selection component 108; this may be referred to as unlocking additional images). For example, new users of blender 100 may be able to select first tier images. More experienced users (e.g., based on blender usage and/or based on orders placed for goods related to the use of blender 100) may be able to select second tier images which are not available to the new users. An even more exclusive set of users may be able to select third tier images which are not available to the other tiers (e.g., VIP or premium users, users with recurring orders of goods related to the use of blender 100, user with a particular account status, etc.). In some implementations, a user (or blender 100) may level up to a higher tier based on the detected triggers (or due to the user unlocked additional images for any of the other reasons described in this disclosure).

Figure 3B:
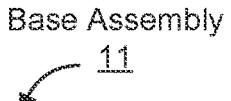

Display component 110 may be configured to control display of images on touchscreen 31. Display component 110 may be configured to display an individual image selected by selection component 108 on touchscreen 31. In some implementations, display component 108 may be configured to modify the display of a particular image on touchscreen 31, e.g., based on elapsed time, time of day, ambient lighting conditions, etc. For example, a particular image may include a daytime and a nighttime version, one of which may be selected based on the time of day or based on ambient lighting conditions. For example, a particular image may be gradually modified (e.g., the colors may be modified, or additional details may be added) as time passes, or every time blender 100 is used, or at other moments. In some implementations, display component 110 may modify an individual image (e.g., to gradually morph into another image) based on trigger events that have been detected by blender 100. In some implementations, the displayed image may be modified after every 10th usage of blender 100, and/or replaced after 100 uses. By way of non-limiting example, FIG. 3A depicts a front view of base assembly 11 of blender 100 configured to blend foodstuffs and display an image 31a on touchscreen 31. Image 31a may have been selected by a user, through user interface 29, from a set of images stored in electronic storage 130. By way of non-limiting example, FIG. 3B depicts a front view of base assembly 11 of blender 100 configured to blend foodstuffs and display an image 31b on touchscreen 31. Image 31b may have been selected by a user or by blender 100, subsequent to detection of a trigger event. In some implementations, image 31b may be modified based on use of blender 100, elapsed time, time of day, and/or based on other conditions. For example, image 31b may include a daytime version and a nighttime version depicting a similar scene. In some implementations, a clock may be superimposed on the displayed image.

In some implementations, different images may become available for selection by the user based on detected trigger events, including but not limited to achievements by the user. For example, a sequence of a predetermined number of consecutive days (a.k.a. a streak) of using blender 100 may unlock images that are otherwise unavailable. By achieving a streak of 10 days, a user may select from a first subset of additional images (or a first tier of images). By achieving a streak of 30 days, a user may select from a second subset of additional images (or a second tier of additional images, the second tier being higher than the first tier), and so forth. In some implementations, additional images may be limited edition or special edition images (e.g., these may be limited to special editions of the blender, or special promotional events (e.g., in cross-promotions with other brands, such as fashion brands, apparel brands, entertainment and/or media brands, etc.), or achievements, and/or other types of trigger events). Any of the reasons described in this disclosure to make images become available for selection may be used to modify the display of images, and vice versa.

Motor component 112 may be configured to control electrical motor 14. In some implementations, motor component 112 may control electrical motor 14 responsive to and/or otherwise based on user input received from a user, e.g., through user interface 29. In some implementations, motor component 112 may control different modes of operation for blender 100 and/or motor 14, including but not limited to a first mode during which electrical motor 14 is not driving rotation of blending component 133, and a second mode during which electrical motor 14 is driving rotation of blending component 133.

Figure 3C:
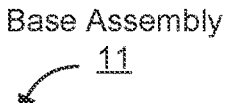
Figure 3D:
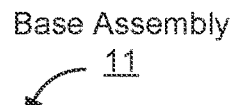

Communication component 114 may be configured to communicate electronically with an external computing device (e.g., a server, a client computing device, and/or other types of computing devices). In some implementations, communication component 114 may communicate electronically with a computing device, through transceiver 15. In some implementations, communication component 114 may obtain additional images, through transceiver 15 of blender 100, from a computing device. In some implementations, communication component 114 may be configured to store the obtained additional images in electronic storage 130. In particular, the additional images may be added to the set of images stored in electronic storage 130, for future use (i.e., for display on touchscreen 31). By way of non-limiting example, FIG. 3C depicts a front view of base assembly 11 of blender 100 configured to blend foodstuffs and display an image 31c on touchscreen 31. Image 31c may be an additional image communicated electronically from an external device or server to blender 100 (e.g., through communication component 114 and/or other components of blender 100) and stored in electronic storage 130, prior to being selected by a user and displayed on touchscreen 31. In some implementations, image 31c may be modified based on use of blender 100, and/or based on detected trigger events. For example, based on the current streak of usage by the user, additional pieces of fruit may be added to image 31c, to visually represent a streak of usage. In some implementations, electronic communication by communication component 114 may use a wired connection through charging/data interface 25 (e.g., in cases charging/data interface 25 is a universal serial bus (USB) port that is connected by a cable to a portable computing device such as a cellphone, e.g., to obtain additional images). Alternatively, and/or simultaneously, communication component 114 may use a wireless connection through transceiver 15 (e.g., using a wireless communication link based on the Bluetooth family of communication standards that is connected to a portable computing device such as a cellphone). For example, transceiver 15 may include and/or be associated with an antenna (which may also be included in blender 100, though not depicted) configured to establish a wireless communication channel. In other implementations, transceiver 15 may be configured to establish a Wi-Fi connection with a local router, and through that router with some server and/or a website (e.g., to obtain one or more additional images). In some cases, establishing the electronic communication may be initiated by a user. Alternatively, and/or simultaneously, establishing the electronic communication may be initiated by a third party, or by blender 100. By way of non-limiting example, FIG. 3D depicts a front view of base assembly 11 of blender 100 configured to blend foodstuffs and display an image 31d on touchscreen 31. Image 31d may be an additional image communicated electronically from a portable computing device of a user to blender 100 (e.g., through charging/data interface 25 and/or other components of blender 100) and displayed on touchscreen 31. For example, in some cases, image 31d may be unlocked based on achievements by the user, or based on a promotional event.

In some implementations, one or more mechanical couplings 16 may include threaded couplings. For example, one or more mechanical couplings 16 may include a first mechanical coupling and a second mechanical coupling. In some implementations, the first mechanical coupling may be included in base assembly 11, and may be a female threaded coupling configured to fit together with the second mechanical coupling (which may be included in container assembly 12). The first mechanical coupling and the second mechanical coupling may be configured to (temporarily and detachably) couple base assembly 11 to container assembly 12.

Referring to FIG. 1, in some implementations, base assembly 11 may have a cylindrical and/or conical shape (apart from blending component 133 and/or set of blades 13). In some implementations, the shape of base assembly 11 may have a base diameter between 2 and 4 inches. In some implementations, the shape of base assembly 11 may have a base diameter between 3 and 3.5 inches. Such a base diameter may improve portability, as well as allow blender 100 to be stored in a cup holder, e.g., in a vehicle.

Referring to FIG. 1, touchscreen 31 may be curved to match the cylindrical and/or conical shape of base assembly 11. In some implementations, touchscreen 31 may sit flush on base assembly 11. In some implementations, touchscreen 31 may include one or more of a lens, a glass top, an optical element, and/or other components. In some implementations, touchscreen 31 may be flat (i.e., level) and include a curved (topical) lens. The lens may be curved to match the cylindrical and/or conical shape of base assembly 11. The lens may be positioned on top of touchscreen 31 and/or may give the appearance that touchscreen 31 is curved. In some implementations, touchscreen 31 may protrude out from base assembly 11, such that the edge of touchscreen 31 creates a lip with base assembly 11. In some implementations, the lip of touchscreen 31 may have a height of 1 millimeters, 2 millimeters, 3 millimeters, and/or other measurements. In some implementations, the lip may surround the circumference of touchscreen 31. In some implementations, round touchscreen 31 may have a diameter of about 1 inch, about 1.5 inch, about 2 inches, between 1 and 2 inches, between 1.5 and 2.5 inches, between 2 cm and 4 cm, between 3 cm and 5 cm, and/or other diameters and diameter ranges.

Referring to FIG. 1, container assembly 12 may include one or more of a container body 20, a cap 24 (e.g., to prevent spilling during blending), a carrying strap 3 (e.g., configured to carry blender 100), and/or other components. Container body 20 may form a vessel to hold and/or contain foodstuffs within container assembly 12. In some implementations, container body 20 may be a cylindrical body and/or have a cylindrical shape. In some implementations, container body 20 may be open at one or both ends. In some implementations, container body 20 may be closed at the bottom. In some implementations, the dimensions of container assembly 12 may be such that the internal volume of container assembly 12 can hold 8, 10, 12, 14, 16, 18, 20, 22, 24, 28, 32, 36, 48, or more ounces. In some implementations, container assembly 12 and/or container body 20 may have cylindrical shapes.

Referring to FIG. 1, electrical motor 14 may be configured to rotationally drive blending component 133. In some implementations, electrical motor 14 may operate at a voltage between 5V and 15V. In one or more preferential implementations, electrical motor 14 may operate at a voltage of about 7.4V. In some implementations, electrical motor 14 may be configured to spin blending component 133 at a maximum speed between 15,000 rotations per minute (RPM) and 40,000 RPM. In one or more preferential implementations, electrical motor 14 may spin blending component 133 at a maximum speed of about 22,000 RPM. Electrical motor may be configured to be powered by a rechargeable battery (not depicted). Simultaneously, in some implementations, electrical motor 14 may be further configured to be powered through (standardized) charging/data interface 25, though that may not be the preferred way of operating blender 100. In one or more preferential implementations, no power is (or need be) supplied to electrical motor 14 from an external power source during blending by blender 100. In some implementations, motor component 112 may be configured to control electrical motor 14 during rotation of blending component 133. For example, motor component 112 may control the speed of the rotation of blending component 133 during blending by blender 100.

In some implementations, a rechargeable battery may be configured to power electrical motor 14. In some implementations, the rechargeable battery may be configured to power electrical motor 14 such that, during blending by blender 100, no power is supplied to electrical motor 14 from an external power source. In some implementations, the rechargeable battery may have a capacity between 1000 mAh and 10000 mAh, e.g., about 2500 mAh. In some implementations, blender 100 may be configured to control charging of the rechargeable battery. For example, the transfer of electrical power through standardized charging/ data interface 25 into the rechargeable battery may be controlled.

Charging/data interface 25 may be standardized and may be configured to communicate with blender 100 and/or conduct electrical power to blender 100 (e.g., to a rechargeable battery). In some implementations, charging/data interface 25 may be configured to conduct electrical power to charge a rechargeable battery, e.g., from an external power source. In some implementations, charging/data interface 25 may be configured to support wireless charging of a rechargeable battery, e.g., from an external power source, including but not limited to induction-based charging. In some implementations, charging/data interface 25 may be a universal serial bus (USB) port configured to receive an electrical connector for charging and/or data communication. A USB port is merely one type of standardized interface. Other standards are contemplated within the scope of this disclosure.

Detector 18 may be configured to detect whether mechanical couplings 16 are coupled in a manner operable and suitable for blending by blender 100. In some implementations, operation of detector 18 may use one or more magnetic components. For example, in some implementations, one or more magnetic components are included in container body 20. Engagement may be detected responsive to these one or more magnetic components being aligned and sufficiently close to one or more matching magnetic components that may be included in base assembly 11. In some implementations, blender 100 may include one or more alignment indicators to visually aid the user in aligning base assembly 11 with container assembly 12 in a manner operable and suitable for blending. Alignment indicators may be in the front, in the back, and/or in other parts of blender 100.

User interface 29 is (part of) the user interface of blender 100. Through this user interface, a user of blender 100 may control the operation of blender 100, including but not limited to transitions between different modes of operation.

For example, the different modes of operation may include one or more blending modes of operation. For example, in some implementations, the modes of operation include a ready-to-blend mode. During the ready-to-blend mode, blender 100 is not blending, but blender 100 may be ready to blend (i.e., ready to initiate blending). For example, blender 100 may have sufficient power for blending, and mechanical couplings 16 may be coupled in a manner operable and suitable for blending. The transitions may include transitions from the ready-to-blend mode to one of the blending modes of operation, and/or vice versa.

In some implementations, user interface 29 may include one or more touchscreens, such as touchscreen 31. For example, a touchscreen of user interface 29 may be configured to receive user input. As used herein, user input of a touchscreen may include one or more of tapping touchscreen 31, multiple consecutive occurrences of tapping on touchscreen 31, swiping touchscreen 31 (e.g., horizontally, vertically, and/or diagonally), and/or other user gestures (by way of non-limiting example, a circular swipe or gesture) or user interactions with touchscreen 31. In some implementations, user interface 29 includes exactly one touchscreen (i.e., touchscreen 31). For example, in some implementations, touchscreen 31 may be the only user-manipulatable portion of user interface 29, such that no other user interface component controls the operation of blender 100 or the transitions between different (blending) modes of operation used by blender 100.

In some implementations, user interface 29 may include one or more controllable light-emitting components. For example, the light-emitting components may be LEDs or other types of lights. In some implementations, the light emitting components may be positioned around the circumference of touchscreen 31. In some implementations the light emitting component may be (part of) touchscreen 31 itself. For example, touchscreen 31 may flash to indicate a transition from one (blending) mode to another (blending) mode. In some implementations, the one or more controllable light-emitting components may be configured to selectively light up. In some implementations, the one or more controllable light-emitting components may be configured to indicate, to a user, a current mode of operation of blender 100, an occurrence of a transition between different modes of operation, a warning for the user, and/or other information regarding the operation of blender 100. For example, the one or more controllable light-emitting components may use different colors, intensities, patterns, sequences, and/or other combinations of light to provide information to the user. In some implementations, user interface 29 may include one or more controllable sound-emitting components, such as a speaker, configured to selectively emit sound. In some implementations, the one or more controllable sound-emitting components may be configured to indicate, to a user, a current mode of operation of blender 100, an occurrence of a transition between different modes of operation, a warning for the user, and/or other information regarding the operation of blender 100. For example, the one or more controllable sound-emitting components may use different frequencies, volumes, patterns, sequences, and/or other combinations of sound to provide information to the user.

Touchscreen 31 may include on or more of an electronic ink design. In some implementations, the electronic ink design may be embedded into touchscreen 31. In some implementations, the electronic ink design may include one or more of a customizable image, a logo, an icon, and/or other designs. In some implementations, the electronic ink design may only be visible to the user when touchscreen 31 is not illuminated and/or turned off. In some implementations, the electronic ink design may be visible to the user when blender 100 is in one or more of a low-power mode, a locked mode, a ready-to-blend mode, a shutdown mode, and/or other modes (of operation).

Processor(s) 132 and/or the instruction components described herein may be configured to control different functions and/or operations of blender 100, including but not limited to turning blender 100 on and off, transitioning between different modes of operation, charging of a rechargeable battery, controlling of electrical motor 14 with regard to rotation of blending component 133 and/or during rotation of blending component 133, determining whether mechanical couplings 16 are engaged properly for blending, controlling or otherwise using user interface 29, and/or performing other functions for blender 100. In some implementations, user interface 29 may convey information regarding the operational status of blender 100 to a user. For example, user interface 29 may include a light that can illuminate in various colors and/or patterns. In some implementations, at least some information processing capabilities in blender 100 may be implemented as a printed circuit board (PCB).

In some implementations, blender 100 may be configured to make detections regarding user input received by one or more touchscreens of user interface 29. For example, user input may include one or more of the user single tapping, double tapping, swiping (horizontally from left to right, horizontally from right to left, vertically from top to bottom, vertically from bottom to top, and/or other types of swiping), tapping and holding, and/or other interactions or types of user input received through touchscreen 31. A first type of detections may indicate occurrences of the user touching touchscreen 31 in a first manner. A second type of detection may indicate occurrences of the user touching touchscreen 31 in a second manner that differs from the first manner. A third type of detection may indicate occurrences of the user touching touchscreen 31 in a third manner that differs from the first manner and the second manner, and so forth. In some implementations, touchscreen 31 may include one or more selection regions. Selection regions may include visible and invisible boundaries that divide the area of touchscreen 31 into separate selection regions. For example, touchscreen 31 may include one of more of two regions, three regions, four regions, six regions, and/or other numbers of regions. By way of non-limiting example, touchscreen 31 may be divided into two selection regions. In some implementations, the two regions may include the top half of touchscreen 31 and the bottom half of touchscreen 31. In some implementations, the two regions may include the left half of touchscreen 31 and the right half of touchscreen 31. In some implementations, the user touching the top half region may indicate occurrences of a particular type of detections and the user touching the bottom half region may indicate occurrences of a different particular type of detections. In some implementations, the user touching the left half region may indicate occurrences of a given type of detections and the user touching the right half region may indicate occurrences of a different type of detections. In some implementations, swiping left-to-right may be a different type of detection than swiping right-to-left. In some implementations, swiping top-to-bottom may be a different type of detection than swiping bottom-to-top.

In some implementations, user interface 29 may enable one or more transitions between different modes of operation. The transition may include a first, second, third, fourth, fifth transition, and so forth. For example, the first transition may be from a ready-to-blend mode to a first blending mode. In some implementations, a transition to the first blending mode may occur responsive to a first occurrence of the first type of detections. For example, the second transition may be from a first blending mode to a ready-to-blend mode. In some implementations, the second transition may occur responsive to a second occurrence of the first type of detection and/or other particular types of detections. Other particular types of detections may include one or more idle durations in which touchscreen 31 does not receive user input for a set duration of time. By way of non-limiting example, the first blending mode may have a fixed time duration, after which the blender may automatically "time-out" and transition to the ready-to-blend mode without user input. For example, the third transition may be from a first blending mode to a second blending mode. The second blending mode may be a different blending mode of operation than the first blending mode. In some implementations, the third transition may occur responsive to a third occurrence of the first type of detections.

In some implementations, blender 100 may be configured to control operations of user interface 29 to enable one or more transitions between displays presented via touchscreen 31 (e.g., different sets of information and/or different options for accepting user input). Displays may include one or more of a home menu, a settings menu, a selection menu, a recipe menu, and/or other menus and/or presentations. For example, a fourth transition may be a transition from a first display to a second display, presented to the user via touchscreen 31. The first display may be one or more of a home menu and/or other displays. The second display may be one or more of a selection menu, a settings menu, a recipe menu, and/or other menus and/or presentations. The second display may be different than the first display. In some implementations, the fourth transition may occur responsive to a particular occurrence of a particular type of detections. For example, a fifth transition may be a transition from the second display to the first display, presented to the user via touchscreen 31. In some implementations, the fifth transition may occur responsive to a particular occurrence of a particular type of detections. For example, a sixth transition may be a transition from the second display to a third display, presented via touchscreen 31. The third display may include one or more of a selection menu, a settings menu, a recipe menu, and/or other menus and/or displays. The third display may be different than the second display and the first display. In some implementations, the sixth transition may occur responsive to a particular occurrence of a particular type of detections.

In some implementations, the second type of detections may include the user swiping touchscreen 31. By way of non-limiting example, the user may swipe in a motion to the right to transition to the second display. For example, the user may swipe to the left to transition from the second display back to the first display. In some implementations, the second type of detections may include the user touching one or more items of a list of one or more items displayed on touchscreen 31. For example, each of the items of the list of items may correspond to one or more different displays touchscreen 31 may present to the user. In some implementations, the user may transition from the current display to the previous display by clicking one of an "X"-button, a back arrow, and/or other icon buttons presented.

In some implementations, user interface 29 may enable the user to make modifications to one or more aspects of one or more modes of operation. Aspects of one of more modes of operations may include one of more of (default) time duration, blending strength, blending speed, number of rotations per second of blending component 133, blending direction, and/or other features of operating modes. In some implementations, modifications to one or more aspects of one of more modes of operation may occur responsive to an occurrence of the third type of detections. By way of non-limiting example, modifications may occur after a transition from a first display to a settings menu display. In some implementations, the transition from the first display to the settings menu display may occur responsive to an occurrence of the second type of detections. In some implementations, the settings menu may include display settings pertaining to touchscreen 31. For example, a user may use the display settings to select a particular image for display on touchscreen 31. For example, a user may use the display settings to modify the display of a particular image on touchscreen 31. In some implementations, selections and/or modifications of images may occur responsive to an occurrence of the third type of detections. In some implementations, the third type of detections may include one or more of single tapping, double tapping, swiping, tapping and holding, and/or other interactions with touchscreen 31. In some implementations, (at least some parts of) the settings menu may appear on touchscreen 31 as a dial. The dial may include one or more indicators and/or one or more time durations corresponding to one or more modes of operation. The user may mimic spinning and/or otherwise rotating the displayed dial as a form or type of user input. The user may swipe touchscreen 31 to initiate an occurrence of the third type of detections. The occurrence of certain types of detections may cause the dial to turn and the indicator to indicate a different time duration than the initial time duration, and, subsequently, may set the new time duration to the pertinent mode of operation.

In some implementations, control by a user of blender 100 may be based on a switch (not shown), a button (not shown), voice-controlled operation (not shown), touch-free gesture-based operation (not shown), and/or other types of user interfaces suitable to control or turn consumer appliances on and off. User interface 29 (e.g., through one or more light-emitting components) may be configured to illuminate in various colors (red, blue, purple, etc.) and/or patterns (solid, fast blinking, slow blinking, alternating red and blue, etc.). User interface 29 may convey information regarding the operational status of blender 100 to a user. For example, if user interface 29 is solid purple, blender 100 may be charging and/or insufficiently charged to blend. For example, if user interface 29 is solid blue, blender 100 may be ready for blending (e.g., in the ready-to-blend mode). For example, if user interface 29 is alternating red and blue, blender 100 may not be ready for blending due to base assembly 11 and container assembly 12 not being coupled properly and/or fully. For example, in some implementations, threaded couplings between assembly 11 and container assembly 12 may need to be tightened sufficiently for proper blending, and user interface 29 may warn the user if needed.

FIG. 2 illustrates a method 200 of blending foodstuffs and displaying customizable images on a touchscreen of a blender, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored in electronic storage. The information includes a set of images. In some embodiments, operation 202 is performed by electronic storage the same as or similar to electronic storage 130 (shown in FIG. 1 and described herein).

At an operation 204, user input is received, by a touchscreen included in a user interface of a blender. In some embodiments, operation 204 is performed by a touchscreen the same as or similar to touchscreen 31 (shown in FIG. 1 and described herein).

At an operation 206, an individual image is selected from the set of images. In some embodiments, operation 206 is performed by a selection component the same as or similar to selection component 108 (shown in FIG. 1 and described herein).

At an operation 208, display of the individual image on the touchscreen is controlled. In some embodiments, operation 208 is performed by a display component the same as or similar to display component 110 (shown in FIG. 1 and described herein).

At an operation 210, an electrical motor of the blender is controlled, responsive to receiving particular user input through the touchscreen. In some embodiments, operation 210 is performed by a motor component the same as or similar to motor component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A portable and rechargeable blender configured to blend foodstuffs, the portable and rechargeable blender comprising:

a blending component configured to rotate and blend the foodstuffs;

an electrical motor configured to drive rotation of the blending component;

a user interface including a touchscreen, wherein the touchscreen is configured to receive user input from a user and to display information;

electronic storage configured to electronically store information, wherein the information includes a set of images; and one or more hardware processors configured by machine-readable instructions to:

select an individual image from the set of images, wherein selection of the individual image is based on the user input received through the touchscreen;

control display of the individual image on the touchscreen; and control the electrical motor during the rotation of the blending component, responsive to receiving particular user input through the touchscreen, wherein at least one particular image in the set of images is made available for display responsive to an achievement by the user pertaining to usage of the portable and rechargeable blender.

2. The portable and rechargeable blender of claim 1, wherein the individual image is displayed during the rotation of the blending component.

3. The portable and rechargeable blender of claim 1, further comprising a transceiver configured to communicate electronically with a computing device, wherein the one or more hardware processors are further configured to:

obtain additional images, through the transceiver, from the computing device; and store the additional images in the electronic storage such that the additional images are part of the set of images and available for display on the touchscreen.

4. The portable and rechargeable blender of claim 3, wherein at least one of the additional images is an animated image, and wherein controlling display of the animated image is performed such that the display of the animated image is animated during blending by the portable and rechargeable blender.

5. The portable and rechargeable blender of claim 1, wherein the achievement by the user pertaining to the usage of the portable and rechargeable blender unlocks the particular image for selection by the user.

6. The portable and rechargeable blender of claim 1, wherein the one or more hardware processors are further configured to modify the display of the individual image on the touchscreen based on elapsed time.

7. The portable and rechargeable blender of claim 1, wherein the one or more hardware processors are further configured to:

detect trigger events based on usage of the portable and rechargeable blender; and modify the display of the individual image on the touchscreen based on one or more of the trigger events.

8. The portable and rechargeable blender of claim 1, wherein the user interface is further configured to present the user with at least one of a settings menu, a selection menu, and a recipe menu, responsive to a detection of a particular type of user input, and wherein responsive to specific user input, a new image is selected for display on the touchscreen and subsequently displayed on the touchscreen.

9. The portable and rechargeable blender of claim 1, wherein controlling display of the individual image on the touchscreen is performed such that the individual image is displayed during blending, wherein the user input includes at least one of:

(i) tapping the touchscreen once, (ii) multiple consecutive occurrences of tapping the touchscreen, and (iii) swiping the touchscreen.

10. A portable and rechargeable blender configured to blend foodstuffs, the portable and rechargeable blender comprising:

a blending component configured to rotate and blend the foodstuffs;

an electrical motor configured to drive rotation of the blending component;

a user interface including a touchscreen, wherein the touchscreen is configured to receive user input from a user and to display information;

electronic storage configured to electronically store information, wherein the information includes a set of images; and one or more hardware processors configured by machine-readable instructions to:

select an individual image from the set of images, wherein selection of the individual image is based on the user input received through the touchscreen;

control display of the individual image on the touchscreen; and control the electrical motor during the rotation of the blending component, responsive to receiving particular user input through the touchscreen, wherein the set of images includes different subsets of images, wherein the different subsets of images correspond to a hierarchy of different tiers of user status, and wherein availability of the different subsets of images for display is based on a current user status of the user.

11. The portable and rechargeable blender of claim 10, wherein the current user status of the user is associated with a user account of the user.

* * * * *